(12) United States Patent
Wada et al.

(10) Patent No.: US 6,701,071 B2
(45) Date of Patent: Mar. 2, 2004

(54) LENS BARREL WITH BUILT-IN BLUR CORRECTION MECHANISM

(75) Inventors: Shigeru Wada, Kishiwada (JP); Akira Kosaka, Yao (JP); Yoshihiro Hara, Kishiwada (JP); Junichi Tanii, Izumi (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/756,264

(22) Filed: Jan. 9, 2001

(65) Prior Publication Data

US 2001/0007612 A1 Jul. 12, 2001

(30) Foreign Application Priority Data

Jan. 11, 2000  (JP) .......................................... 2000-002520
Jan. 11, 2000  (JP) .......................................... 2000-002521

(51) Int. Cl.[7] ................................................. G03B 5/00
(52) U.S. Cl. ....................................................... 396/55
(58) Field of Search .............................. 396/52, 53, 54, 396/55; 348/208.99, 208.11

(56) References Cited

U.S. PATENT DOCUMENTS

| 5,172,276 A | | 12/1992 | Ueyama et al. |
| 5,398,132 A | | 3/1995 | Otani |
| 5,659,806 A | * | 8/1997 | Miyamoto et al. ............ 396/54 |
| 5,715,479 A | | 2/1998 | Katayama et al. |
| 6,307,678 B2 | * | 10/2001 | Kosaka et al. ............... 359/554 |

FOREIGN PATENT DOCUMENTS

JP          11-337996          12/1999

* cited by examiner

*Primary Examiner*—Russell Adams
*Assistant Examiner*—Arthur A Smith
(74) *Attorney, Agent, or Firm*—McDermott, Will & Emery (57) ABSTRACT

A lens-driver for driving a lens for compensating image blur caused by camera shaking has two driving-levers. In each driving-lever, one end is rotatably connected to a lens frame via a holding shaft and the other end is rotatably supported by a rotation shaft. Two driving levers are arranged generally on one straight line, and there is formed a generally perpendicular angle by a line connecting the holding shaft of one driving-lever and an optical center of the lens, and a line connecting the holding shaft of the other driving-lever and the optical center. Another lens-driver has two driving mechanisms. One driving mechanism drives the lens, and the other driving mechanism drives a shutter mechanism or an aperture mechanism. In the lens barrel, one mechanism occupies one half area and the other mechanism occupies the other half area.

20 Claims, 8 Drawing Sheets

Fig. 7 film plane

LENS BARREL WITH BUILT-IN BLUR CORRECTION MECHANISM

BACKGROUND OF THE INVENTION

This application is based on applications No. 2520/2000 and No. 2521/2000 filed in Japan, the contents of which are hereby incorporated by reference.

1. Field of the Invention

The present invention relates to a lens barrel incorporating a blur correction mechanism, which is used in an image taking apparatus such as a camera.

2. Description of the Related Art

There has been an image taking apparatus with a blur correction mechanism incorporated in a lens barrel thereof. Such an apparatus includes an apparatus with a variable vertical angle prism in which viscous fluid is sealed by two glasses, the relative angle of which is changed by an actuator, and an apparatus with a correction lens (or compensation lens) which is displaced parallel to an X axis and a Y axis.

The blur correction (compensation) mechanism with the parallel displaceable correction lens makes a size of a lens barrel bigger, since the correction lens is displaced or moved parallel to two axes that cross perpendicular to each other. In addition, the blur correction mechanism with the parallel displaceable correction lens employs an electromagnetic drive device for performing a thrust drive operation by oscillating coil, or for performing a lever drive operation by a motor, which also causes the lens barrel size to be increased since the driving force of the electromagnetic drive device is small per unit volume thereof.

On the other hand, a recent LS camera (i.e. a lens shutter cameras) is becoming smaller in size and larger in magnification, which increases the necessity for blur correction or compensation. Any conventional blur correction mechanism, however, has been too large to be applied to the LS camera.

SUMMARY OF THE INVENTION

It is therefore an object of the present invention to provide a lens driving mechanism for the correction lens which contributes to a miniaturization thereof, thus contributing to a compactness of a camera with the lens barrel into which the lens driving mechanism is incorporated.

In accomplishing this and other objects of the present invention, according to an aspect thereof, there is provided a lens driving mechanism, comprising: a lens; a frame for holding the lens; a first lever, one end of which is rotatably connected to the frame via a first holding shaft which extends parallel to an optical axis of the lens, and the other end of which is rotatably supported by a first rotation shaft; and a second lever, one end of which is rotatably connected to the frame via a second holding shaft which extends parallel to the optical axis of the lens, and the other end of which is rotatably supported by a second rotation shaft, wherein the first holding shaft, the first rotation shaft, the second holding shaft, and the second rotation shaft are generally arranged on one straight line, and wherein there is formed a generally perpendicular angle by a line connecting the first holding shaft and an optical center of the lens, and a line connecting the second holding shaft and the optical center of the lens.

In the lens driving mechanism, the lens can be a blur correction (or compensation) lens.

In the lens driving mechanism, there can be minimized a distance change between the first and second holding shafts during the rotation movements of the first and second levers for driving the lens. Therefore, a precise blur correction can be realized by a simple control manner. Further, since the first and second levers can be accommodated in one half of area of a lens barrel at its cross section perpendicular to an optical axis, the lens barrel can be small-sized. It is preferable that the first lever and the second lever are arranged in a plane perpendicular to the optical axis so as to be symmetrical with respect to a line running through the optical center.

According to another aspect of the present invention, there is provided a lens driving mechanism, comprising: a lens barrel; a lens supported in the lens barrel; a first-driving mechanism for driving the lens, which is accommodated in the lens barrel and occupies a first half of a total area of the lens barrel at a cross section perpendicular to an optical axis of the lens; and a second-driving mechanism, which is accommodated in the lens barrel and occupies a second half of the total area thereof at the cross section, wherein the first half and the second half constitute the total area in the cross section of the lens barrel.

In the lens driving mechanism, the lens can be a blur correction (or compensation) lens.

The second driving mechanism can drive other mechanism than the lens, such as a shutter mechanism, an aperture mechanism, and so on.

BRIEF DESCRIPTION OF THE DRAWINGS

This and other objects and features of the present invention will become apparent from the following description taken in conjunction with the preferred embodiment thereof with reference to the accompanying drawings, in which.

DETAILED DESCRIPTION OF THE PREFERRED EMBODIMENTS

Before the description of the embodiment proceed, it is to be noted that like or corresponding parts are designed by like reference numerals throughout the accompanying drawings.

The embodiment of the present invention practiced with a LS camera (lens shutter camera) having a zooming lens barrel will be described hereinafter.

Figure 1:
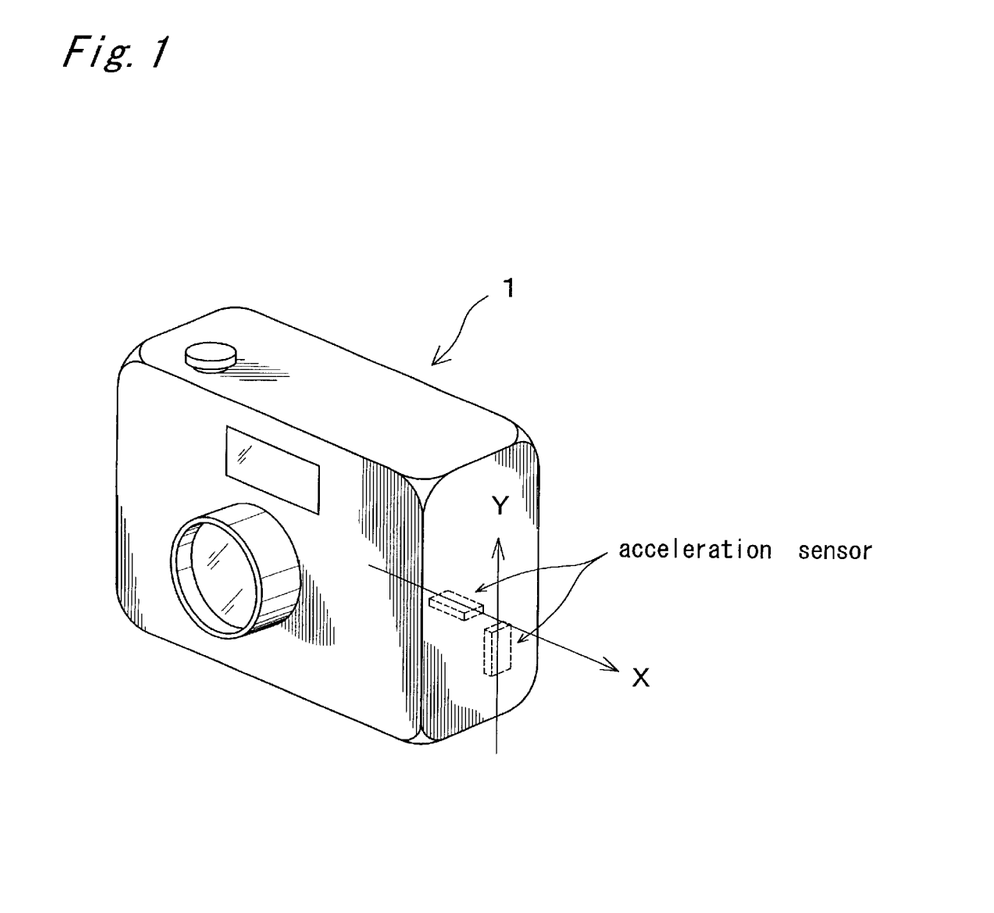
FIG. 1 is a perspective view showing a LS camera according to an embodiment of the present invention.

FIG. 1 is a perspective view of the LS camera 1 with built-in acceleration sensors for detecting acceleration in X and Y directions.

Figure 2:
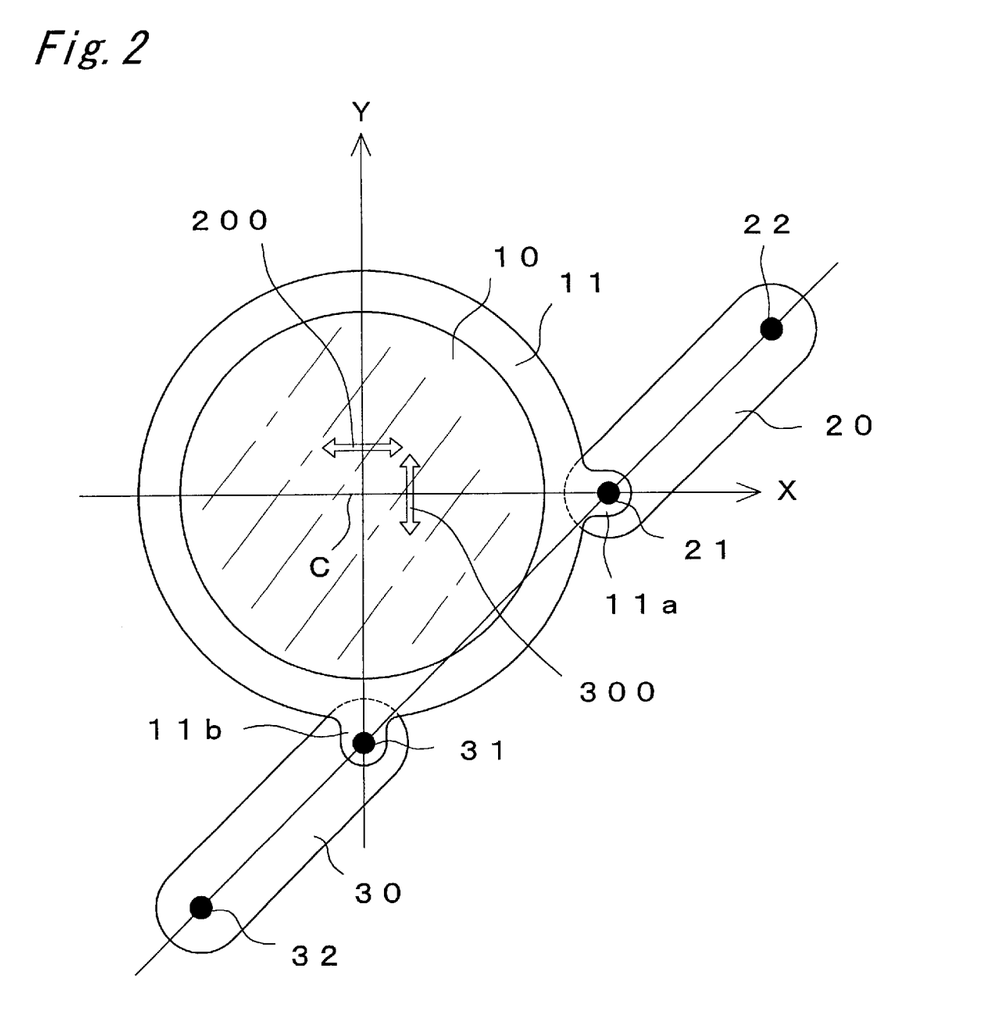
FIG. 2 is a schematic view describing a principle of how to drive a correction lens in a blur correction mechanism of the camera shown in FIG. 1.

FIG. 2 is a schematic view showing a principle of how to drive a blur correction lens (or blur compensation lens) 10 which is disposed inside an image-pickup (image-taking) optical system of the LS camera 1 of FIG. 1. The correction lens 10 is connected, through a holding frame 11 thereof, to an X-lever (X direction drive lever) 20 and a Y-lever (Y direction drive lever) 30. Specifically, the X-lever 20 and Y-lever 30 have lens holding shafts 21 and 31, which are rotatably inserted in holes provided on projections 11a and 11b of the lens holding frame 11. When the X-lever 20 rotates on a rotation shaft 22, the correction lens 10 rotates on the lens holding shaft 31 of the Y-lever 30. This rotational movement, which is small in quantity, can be regarded as a straight-line movement in the direction of the X axis as shown by an arrow 200. Since such a rotational movement changes the distance between two lens holding shafts 21 and 22, at least one of the holes provided on the projections 11a and 11b is given an oval shape rather than a complete round shape to absorb the distance change.

The correction lens 10 is driven in the direction of the Y axis (shown by an arrow 300) by the Y-lever 30, based on the same principle as described above. As will be described later, the correction lens 10 is pressed by a spring against a unit base plate defining a reference plane, and it moves only within the reference plane.

When position control of the correction lens is performed with regarding the rotational movement as a straight-line movement as described above, it is preferable that "a line connecting the lens holding shaft 21 and the center "C" of an optical axis (i.e. the center of the correction lens 10)" is orthogonal to "a line connecting the lens holding shaft 31 and the center "C" of the optical axis". If such an accurately orthogonal crossing is not possible from a viewpoint of design constraint, or from a view point of the requirements for downsized lens barrel, crossing at angles of 90°±30° is actually acceptable.

Figure 3:
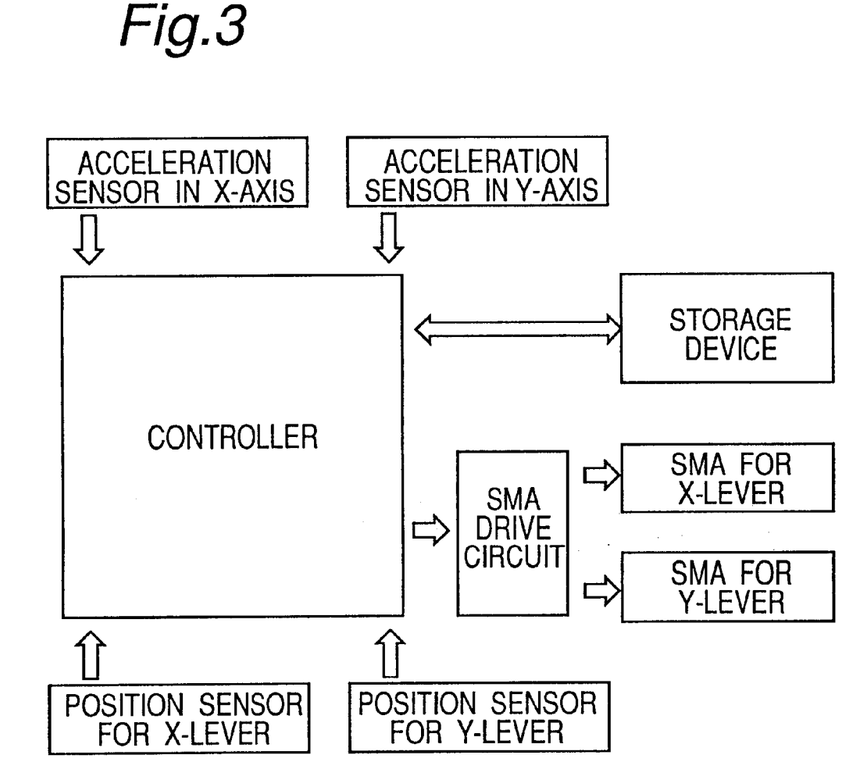
FIG. 3 is a block diagram showing a control system of the camera shown in FIG. 1.

FIG. 3 is a block diagram showing a control system of the camera 1. A control procedure will be outlined below:
(1) A direction and quantity of displacement (shift or movement) of the camera caused by a camera shake are detected by the acceleration sensors shown in FIG. 1, the camera shake being brought about when the user/photographer handles the camera manually;
(2) a current position "A" of the X-lever 20 and Y-lever 30 is detected by using such a position sensor as a photo reflector;
(3) a position "B" of the correction lens after a predetermined period of time, which is necessary to compensate the blur, is calculated based on the "direction and quantity of the displacement" by a control section;
(4) a position "C" of each lever, that corresponds to the position "B" of the correction lens, is calculated based on a preinstalled "correction table (indicating a correlation between a location of each lever and a location of the correction lens) or on an operational expression"; and
(5) electric current to be supplied to an SMA (i.e. shape memory alloy) is determined from a difference between "the current position "A"" and "the calculated position "C" of each lever". Supplied electric current rises temperature of the SMA, and causes deformation thereof (shrinkage of a wire-shaped SMA according to embodiment of the present invention), by which the X-lever 20 and Y-lever 30 are to be moved to the position "C" as described later.

Figure 4:
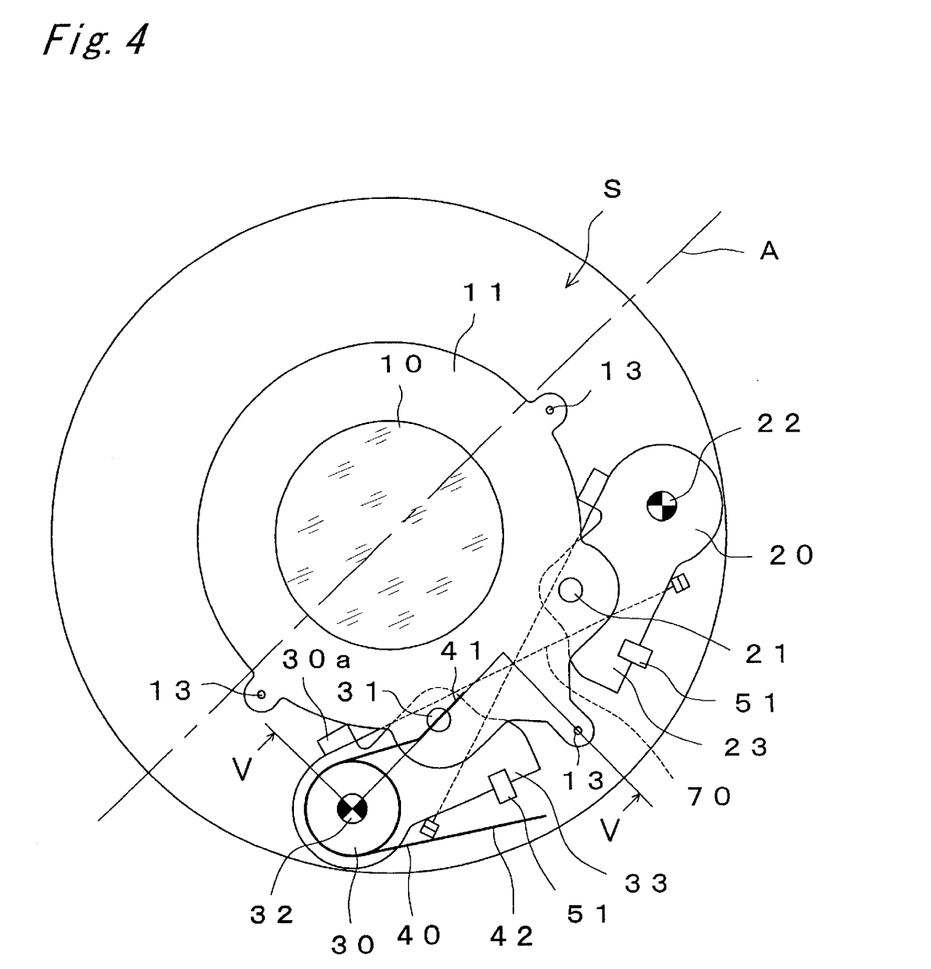
FIG. 4 is a fragmentary plain view showing a part of a driving mechanism according to the embodiment of the present invention, to which the principle shown in FIG. 2 is applied.
Figure 5:
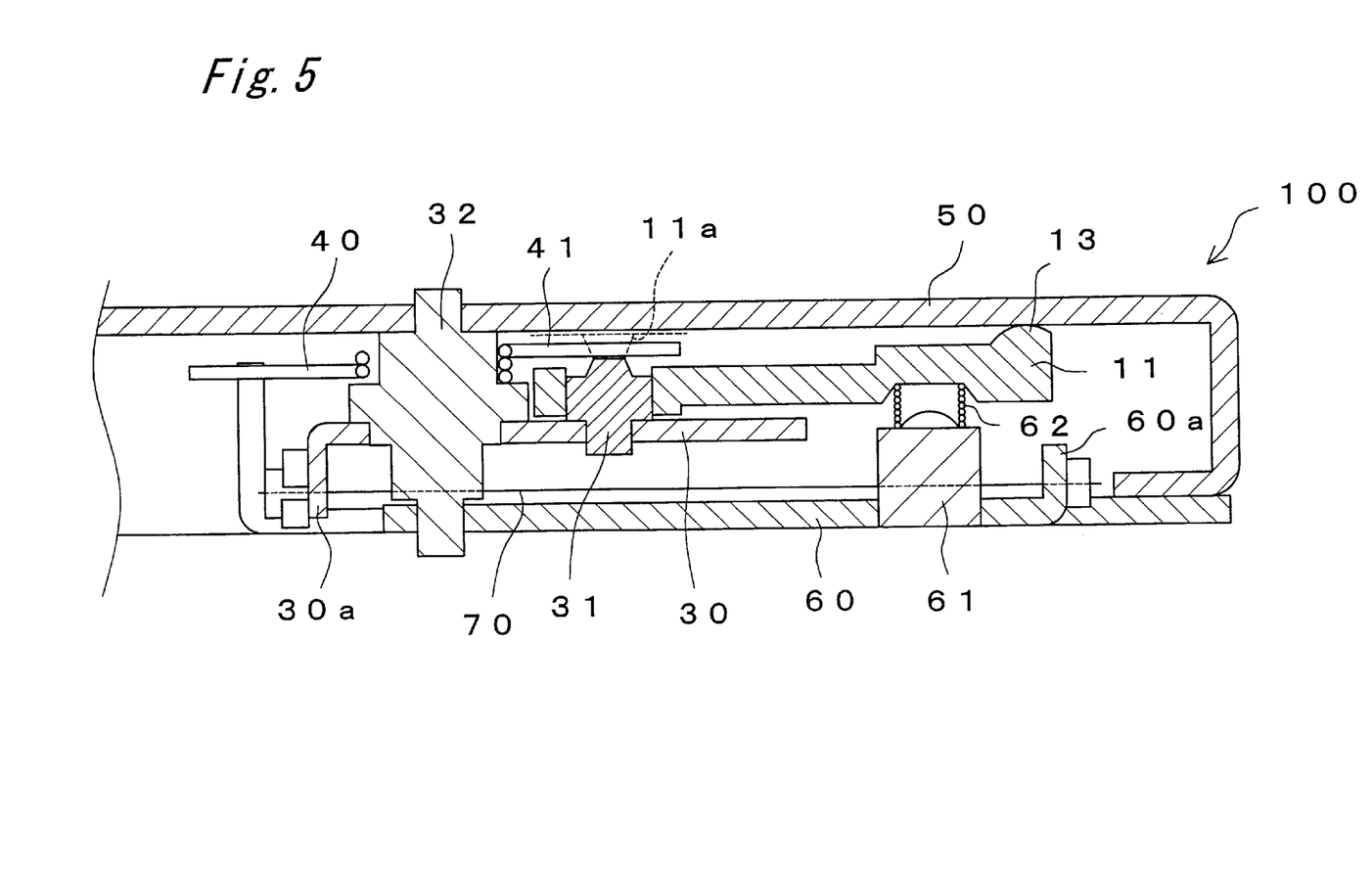
FIG. 5 is a cross-sectional view taken in the line V—V in FIG. 4.

FIG. 4 is a fragmentary plane view of a blur correction unit 100 structured on the basis of the drive principle described in FIG. 2. FIG. 5 is a cross-sectional view taken in the line V—V of FIG. 4. The blur correction unit 100 is so structured that the correction lens 10 and the drive mechanism thereof are inserted between a base plate 50 and a top plate 60. As the X-lever 20 and Y-lever 30 are in a mirror-image relation, description will be given below of only the Y-lever 30 in FIGS. 4 and 5.

The Y-lever 30 is held rotatable around the rotation shaft 32. Around the rotation shaft 32, there is mounted a bias spring 40 having two arms 41 and 42. The arm 42 is in contact with a unit wall while the arm 41 is in contact with a taper 11a (shown in FIG. 5) of the lens holding frame 11. The lens holding frame 11 is connected to the Y-lever 30 through the lens holding shaft 31. Consequently, the bias spring 40 rotates the Y-lever 30 counterclockwise around the rotation shaft 32 in FIG. 4.

Since the arm 41 is in contact with the taper 11a of the lens holding frame 11, the bias spring 40 presses the lens holding frame 11 against the base plate 50 shown in the upper side in FIG. 5, in addition to rotating the Y-lever 30 in the counterclockwise direction. A pressing spring 62 mounted on a pedestal 61 attached to the top plate 60 also presses the lens holding frame 11 against the base plate 50. Accordingly, the lens holding frame 11 is pressed against base plate 50 by 3 springs in total: the bias spring 40 for the Y-lever, the bias spring for the X-lever (not illustrated), and the pressing spring 62.

The lens holding frame 11 is in contact with the base plate 50 via three contacting projections 13 thereof. Consequently, the correction lens 10 held by the lens holding frame 11 moves along and within only the reference plane defined by the base plate 50. The lens holding frame 11 is pressed against the base plate 50 with the three springs, so that the correction lens 10 is prevented from being out of the reference plane.

A part of the Y-lever 30 is folded downwardly as shown in FIG. 5. This folded section 30a constitutes a SMA holding section. To the SMA holding section 30a, is fixed one end of a wire-shaped SMA 70 with the aid of a screw. On the other hand, a part of the top plate 60, shown on the lower side in FIG. 5, is folded upwardly to form a SMA holding section 60a, to which the other end of the SMA 70 is fixed. The SMA 70 memories (or remembers) a specified length at a specified temperature. Once an electric current is applied and the SMA 70 is heated, it shrinks to restore to the specified length. As a result, when the temperature of the SMA 70 rises, the Y-lever 30 is rotated clockwise in FIG. 4 around the rotation shaft 32.

Thus, the Y-lever 30 is forced to rotate counterclockwise by the bias spring 40, and to rotate clockwise by the SMA 70. By controlling the current applied to the SMA 70, therefore, the rotational movement of the Y-lever 30 can be controlled, which in turn controls the displacement of the correction lens 10 in the direction of Y axis (see FIG. 2). In the same way, to control the rotational movement of the X-lever 20 enables the displacement of the correction lens 10 to be controlled in the direction of X axis (see FIG. 2). An edge 33 of the Y-lever 30 constitutes a detection edge for a photo reflector 51 (see FIG. 4) attached to the base plate 50 to detect a position of the Y-lever 30.

In the Y-lever 30, the ratio of "a distance from the rotation shaft 32 to the SMA holding section 30a" to "a distance from the rotation shaft 32 to the lens holding shaft 31" (lever ratio) is preferably 1.5 to 3. In other words, a displacement quantity of the correction lens is preferably 1.5 to 3 times larger than an extension and shrinkage quantity of the SMA.

The same bias spring as described above is also provided on the X-lever 20, though it is not illustrated in FIG. 4 for simplification. The rotational control and positional detection of the X-lever 20 is performed in the same manner as that of the Y-lever 30. As shown in Fig, 4, the SMA for the X-lever 20 and the SMA for the Y-lever 30 are overcrossed (or overpassed) inside the lens barrel. This is an attempt to use an SMA wire as long as possible within a limited space inside the lens barrel, which is necessary to compensate the SMA's small deformation.

As shown in FIG. 4, two arms 41 and 42 are extended in parallel from the bias spring 40. This structure has the advantage of preventing reactive force, acted on the arms 41 and 42 from the unit wall and lens holding frame 11, from directly acting on the rotation shaft 32, thereby implementing smooth rotation of the rotation shaft, and also preventing the rotation shaft from tumbling down due to poor rigidity.

Figure 6A:
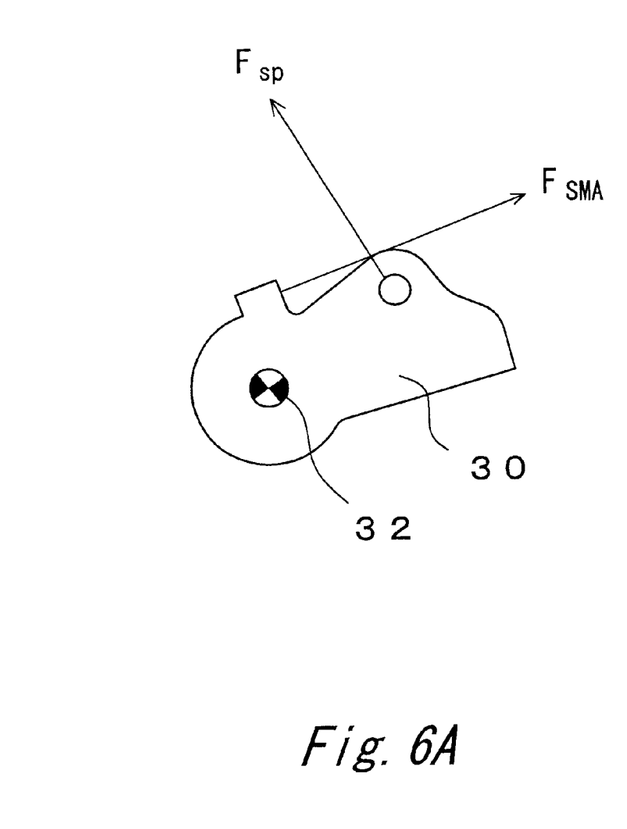
FIG. 6A is a schematic view showing the Y-lever 30 of FIG. 4.
Figure 6B:
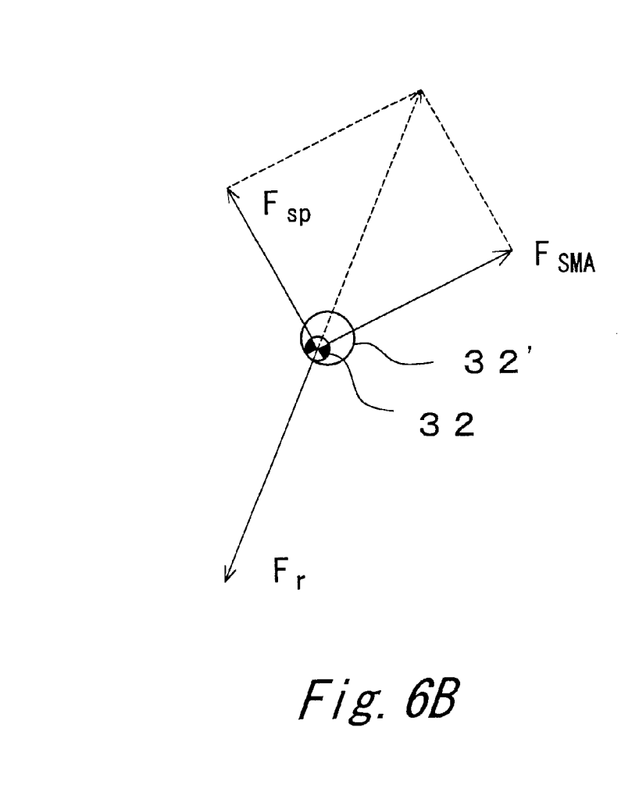
FIG. 6B is an explanatory view showing forces applied on the Y-lever vectors.

In the embodiment, the bias springs and the SMA are so arranged as to prevent each drive lever from wobbling around the corresponding rotation shaft when rotating around it. The arrangement will be described with reference to FIG. 6. FIG. 6A shows the Y-lever 30 in FIG. 4. As described above, the Y-lever 30 is driven by the bias spring 40 and the SMA 70 and rotates around the rotation shaft 32. In FIG. 6B, $F_{SMA}$ represents a vector of a force exerted upon the Y-lever 30 by the SMA 70, while $F_{SP}$ represents a vector of a force exerted upon the Y-lever 30 by the bias spring 40. $F_R$ represents a vector of a reactive force exerted upon the Y-lever 30 from the rotation shaft 32. A reference numeral 32' shows an insertion hole for the rotation shaft, which is illustrated in an exaggerated scale for easier understanding.

As can be understood from FIG. 6B, if the vectors $F_{SMA}$ and $F_{SP}$ change in magnitude, direction of $F_R$ changes. The change in direction of $F_R$ changes the contact point of the drive shaft 32 with the hole 32'. If the change is large, the wobble of the Y-lever 30 becomes large during the extension and shrinkage movements of the SMA 70, which degrades accuracy of the blur correction. The most ideal angle formed by $F_{SMA}$ and $F_{SP}$, is zero since it causes no displacement of the contact point therebetween. However, there may be a case having difficulties in setting the angle to zero due to, for example, a constraint of design for the purpose of preventing the size of the lens barrel from increasing. In practice, sufficient accuracy of blur correction is achieved by setting the angle formed by $F_{SMA}$ and $F_{SP}$ to 120° or less.

Figure 7:
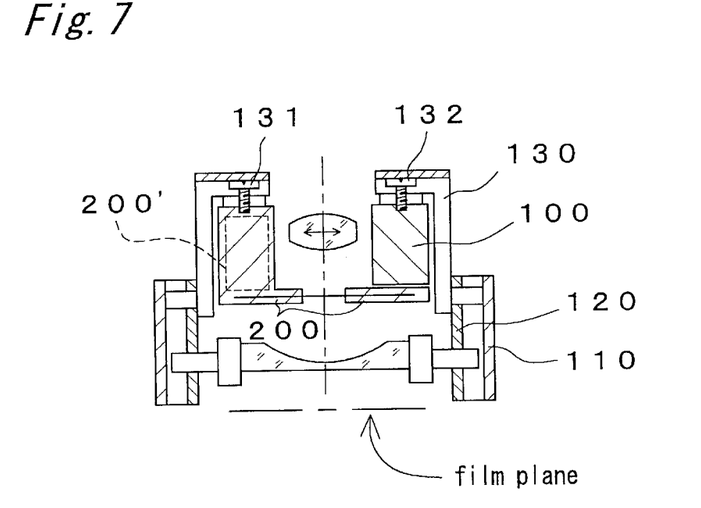
FIGS. 7 to 9 are fragmentary cross-sectional views showing examples of arrangement of the blur correction unit in the lens barrel according to the embodiment of the present invention.
Figure 8:
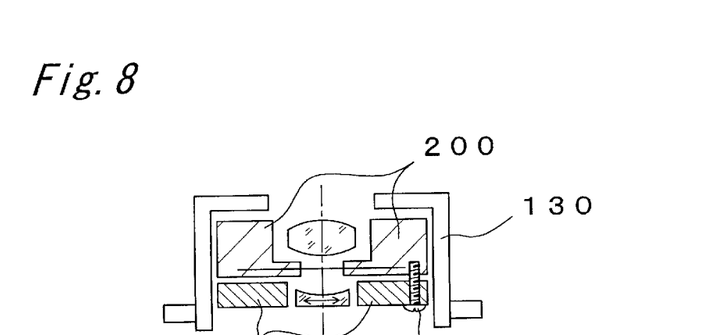
Figure 9:
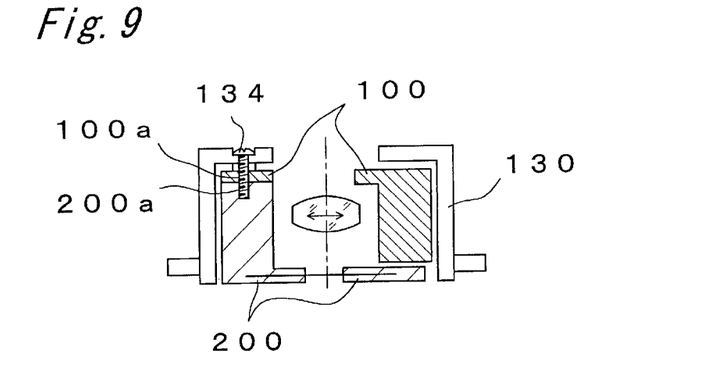

FIGS. 7 to 9 are fragmentary cross-sectional views of examples showing how the blur correction unit 100 is arranged in the lens barrel. The structure of a zoom lens barrel itself, illustrated in these figures, is generally known to public. When a rotating cylinder 120 rotates inside a stationary cylinder 110 fixed immovably to a main body of the camera not illustrated, a forwarding cylinder 130 is protruded.

In the example shown in FIG. 7, a blur correction unit 100 and a shutter unit 200 are independently fixed to the lens barrel with screws 131 and 132, respectively. Directly fixing each unit to the lens barrel can minimize assembly error. In the example shown in FIG. 8, the blur correction unit 100 and shutter unit 200 are joined together with a screw 133 and then fixed to the lens barrel by fixing means not illustrated herein.

FIG. 9 shows an example of direct co-fixing of the blur correction unit 100 and shutter unit 200 to the lens barrel. In this example, the blur correction unit 100 and shutter unit 200 have screw holes 100a and 200a, which are aligned linearly with each other. Each unit is directly fixed to the lens barrel by engaging one screw into the aligned screw holes 10a and 200a, which can minimize potential inclination error of the correction lens. In addition, fixing both units with one screw decreases the number of screws to be used, contributing to cost advantage as well as facilitating quality management. Such a co-fixation may be made in one place (or location) as shown in the figure, or may be made in a plurality of places (or locations).

The shutter unit 200 to be used has its drive mechanism part which is accommodated in one half of the area of the cross section of the lens barrel. In the other half of the area thereof, the drive mechanism of the blur correction unit 100 is disposed. In FIG. 4 where the drive mechanism of the blur correction lens is accommodated in one half of the area in the lens barrel divided by an imaginary line "A", the drive mechanism of the shutter unit 200 is disposed in the area "S", that is the other half of the area in the lens barrel. This minimizes the increase in the size of the lens barrel and makes it possible to accommodate the blur correction unit 100 inside the lens barrel.

Figure 10:
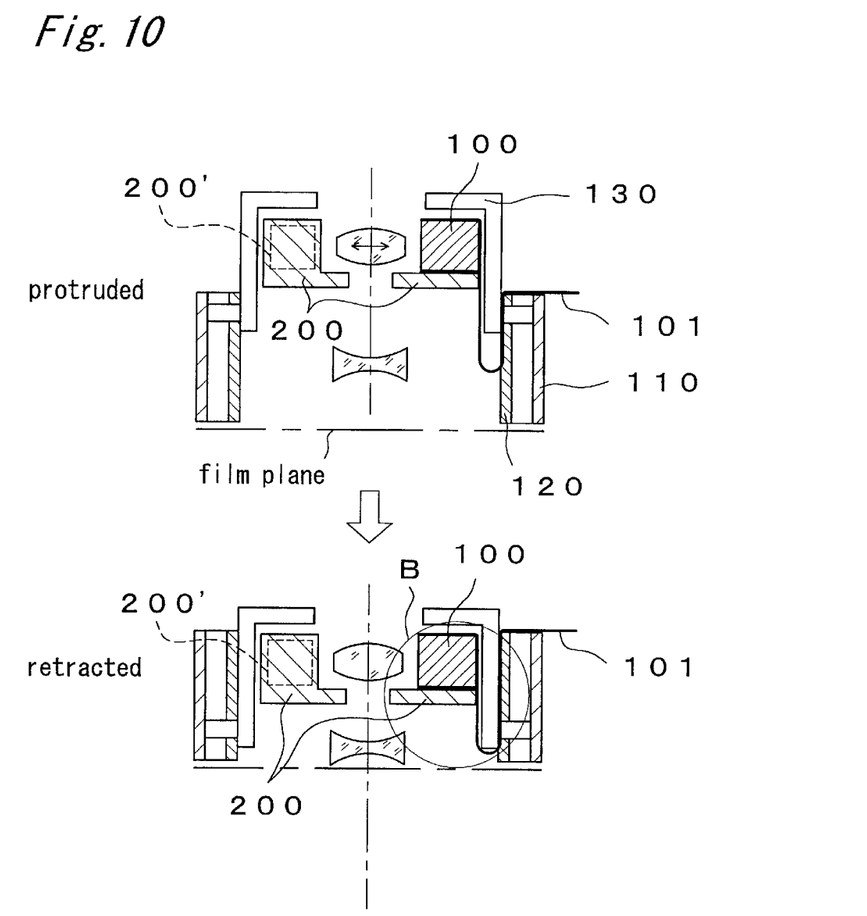
FIG. 10 is a fragmentary cross-sectional view showing an example of arrangement of a flexible circuit board to the blur correction unit according to the embodiment of the present invention.
Figure 11:
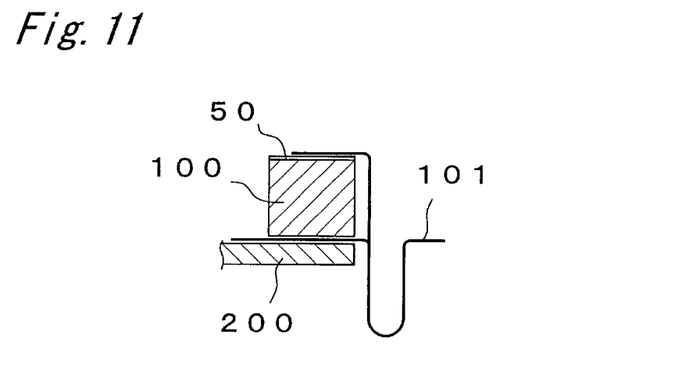
FIG. 11 is a partial enlarged view of FIG. 10.

As is described above, the photo reflector 51 for detecting a location of the Y-lever 30 is attached to the base plate 50 of the blur correction unit 100 (see FIG. 5). The photo reflector 51 is electrically connected to a control system of the main body of the camera through a flexible circuit board 101 running into the blur correction unit 100 from outside, as shown in FIGS. 10 and 11. FIG. 10 is a fragmentary cross-sectional view describing such a configuration, and FIG. 11 is an enlarged schematic view showing the area in the circle "B" in FIG. 10.

The flexible circuit board 101 disposed along the outer surface of the base plate 50 of the blur correction unit 100 is efficiently disposed so as to be extended in the direction of the optical axis inside the lens barrel. Arranging the flexible circuit board 101 outside the unit 100 enables the flexible circuit board to be shared by the unit 200, and in addition prevents the flexible circuit board 101 from interfering with the drive levers 20 and 30 mounted inside of the unit. FIGS. 7 to 11 show the arrangement of the blur correction unit 100 and the shutter unit 200 (consisting of a shutter mechanism and a driving mechanism 200' thereof). As a modification to the embodiment, in the present invention, an aperture unit (not illustrated) can be substituted for the shutter unit 200.

In the illustrated embodiment, each of the drive levers 20 and 30 is rotated in one direction by the SMA and in the other direction by the bias spring. As a modification to the embodiment, each of the drive levers 20 and 30 is rotated in both directions by the SMA.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A lens driving mechanism, comprising:
   a lens;
   a frame for holding the lens;
   a first lever, one end of which is rotatably connected to the frame via a first holding shaft which extends parallel to an optical axis of the lens into a hole ptovided in the frame, and the other end of which is rotatably supported by a first rotation shaft, rotational movement of the first lever causing the frame to swing in a first direction; and a second lever, one end of which is rotatably connected to the frame via a second holding shaft which extends parallel to the optical axis of the lens into another hole provided in the frame, and the other end of which is rotatably supported by a second rotation shaft, rotational movement of the second lever causing the frame to swing in a second direction which is approximately perpendicular to the first direction, wherein the first holding shaft, the first rotation shaft, the second holding shaft, and the second rotation shaft are generally arranged on one straight line, thereby minimizing a distance change between the first and second holding shafts during the rotation movements of the first and second levers, and wherein there is formed a generally perpendicular angle by a line connecting the first holding shaft and an optical center of the lens, and a line connecting the second holding shaft and the optical center of the lens.

2. The lens driving mechanism as claimed in claim 1, wherein the first lever and the second lever are arranged in a plane perpendicular to the optical axis so as to be symmetrical with respect to a line passing through the optical center.

3. The lens driving mechanism as claimed in claim 1, wherein the first lever and the second lever are driven independently to each other, wherein the first lever is driven by a first shape memory alloy in one direction around the first rotation shaft and by a first spring in the other direction around the first rotation shaft, and wherein the second lever is driven by a second shape memory alloy in one direction around the second rotation shaft and by a second spring in the other direction around the second rotation shaft.

4. The lens driving mechanism as claimed in claim 3, wherein the first shape memory alloy and the second shape memory alloy are wire-shaped, and they are overcrossed to each other in a lens barrel.

5. A lens driving mechanism, comprising:

a lens barrel;

a lens supported in the lens barrel;

a first-driving mechanism for driving the lens, which is accommodated in the lens barrel and occupies only a first half of a total area of the lens barrel at a cross section perpendicular to an optical axis of the lens; and a second-driving mechanism for driving a member which is other than the lens driven by the first-driving mechanism, the second-driving mechanism being accommodated in the lens barrel and occupies only a second half different from the first half of the total area of the lens barrel at the cross section, wherein the first half and the second half constitute the total area in the cross section of the lens barrel.

6. The lens driving mechanism as claimed in claim 5, wherein the second-driving mechanism drives a shutter mechanism arranged near the lens.

7. The lens driving mechanism as claimed in claim 5, wherein the second-driving mechanism drives an aperture mechanism arranged near the lens.

8. The lens driving mechanism as claimed in claim 5, wherein the first-driving mechanism comprises:

a first driving-lever, rotatable around a first rotation shaft, for driving the lens;

a first shape memory alloy, which drives the first driving-lever;

a second driving-lever, rotatable around a second rotation shaft, for driving the lens; and a second shape memory alloy, which drives the second driving-lever.

9. The lens driving mechanism as claimed in claim 5, wherein the first-driving mechanism comprises a first driving-lever rotatable around a first rotation shaft and a second driving-lever rotatable around a second rotation shaft, wherein the first driving-lever has a first holding shaft which is rotatably connected to a frame for holding the lens via a first holding shaft which extends parallel to an optical axis of the lens into a hole provided in the frame, and the second driving-lever has a second holding shaft which is rotatably connected to the frame for holding the lens via a second holding shaft which extends parallel to the optical axis of the lens into another hole provided in the frame, so that when one of the first driving-lever and the second driving-lever rotates around its rotation shaft, the lens is driven around the first holding shaft or the second holding shaft which belongs to the other of the first driving-lever and the second driving-lever.

wherein the first holding shaft, the first rotation shaft, the second holding shaft, and the second rotation shaft are generally arranged on one straight line, and wherein there is formed a generally perpendicular angle by a line connecting the first holding shaft and an optical center of the lens, and a line connecting the second holding shaft and the optical center of the lens.

10. The lens driving mechanism as claimed in claim 6, further comprising a blur correction unit which accommodates the first-driving mechanism, and a shutter unit which accommodates the second-driving mechanism, wherein the blur correction unit has a first screw hole and the shutter unit has a second screw hole, the first screw and the second screw being aligned on one straight line, and wherein the blur correction unit and the shutter unit are jointly fixed to the lens barrel by using one screw which engages into the first screw hole and the second screw hole aligned with each other.

11. The lens driving mechanism as claimed in claim 7, further comprising a blur correction unit which accommodates the first-driving mechanism, and an aperture unit which accommodates the second-driving mechanism, wherein the blur correction unit has a first screw hole and the aperture unit has a second screw hole, the first screw and the second screw being aligned on one straight line, and wherein the blur correction unit and the aperture unit are jointly fixed to the lens barrel by using one screw which engages into the first screw hole and the second screw hole aligned with each other.

12. The lens driving mechanism as claimed in claim 8, wherein the first lever and the second lever are driven independently to each other, wherein the first lever is driven by a first shape memory alloy forcing the first lever in one of two rotational directions around the first rotation shaft and a first spring forcing the first lever in the other thereof around the first rotation shaft, and wherein the second lever is driven by a second shape memory alloy forcing the second lever in one of two rotational directions around the second rotation shaft and a second spring forcing the second lever in the other thereof around the second rotation shaft.

13. A lens driving mechanism, comprising:

a lens;

a frame for holding the lens;

a first lever, one end of which is rotatable connected to the frame via a first holding shaft which extends parallel to an optical axis of the lens, and the other end of which is rotatably supported by a first rotation shaft, rotational movement of the first lever causing the frame to swing in a first direction; and a second lever, one end of which is rotatably connected to the frame via a second holding shaft which extends parallel to the optical axis of the lens, and the other end of which is rotatably supported by a second by a second rotation shaft, rotational movement of the second lever causing the frame to swing in a second direction which is approximately perpendicular to the first direction, wherein the first holding shaft, the first rotation shaft, the second holding shaft, and the second rotation shaft are generally arranged on one straight line, thereby minimizing a distance change between the first and second holding shafts during the rotation movements of the first and second levers, and wherein there is formed a generally perpendicular angle by a line connecting the first holding shaft and an optical center of the lens, and a line connecting the second holding shaft and the optical center of the lens.

14. The lens driving mechanism as claimed in claim 13, wherein the first lever and the second lever are arranged in a plane perpendicular to the optical axis so as to be symmetrical with respect to a line passing through the optical center.

15. The lens driving mechanism as claimed in claim 13, wherein the first lever and the second lever are driven independently to each other, wherein the first lever is driven by a first shape memory alloy in one direction around the first rotation shaft and by a first spring in the other direction around the first rotation shaft, and wherein the second lever is driven by a second shape memory alloy in one direction around the second rotation shaft and by a second spring in the other direction round the second rotation shaft.

16. The lens driving mechanism as claimed in clam 15, wherein the first shape memory alloy and the second shape memory alloy are wire-shaped, and they are overcrossed to each other in a lens barrel.

17. A lens driving mechanism, comprising:

a lens with a frame for holding the lens;

a first lever which is rotatably supported by a first rotation shaft and connected to the frame by a first holding shaft for driving the lens via the frame; and a second lever which is rotatably supported by a second rotation shaft and connected to the frame by a second holding shaft for driving the lens via the frame;

wherein the first and second rotation shafts and the first and second holding shafts are parallel to an optical axis of the lens, and arranged in respective positions which are generally on one straight line in a plane perpendicular to the optical axis.

18. The lens driving mechanism as claimed in claim 17, wherein the first lever and the second lever are arranged in the plane perpendicular to the optical axis so as to be symmetrical with respect to a line passing through the optical center.

19. The lens driving mechanism as claimed in claim 17, wherein the first lever and the second lever are driven independently to each other;

wherein the first lever is driven by a first shape memory alloy in one direction around the first rotation shaft and by a first spring in the other direction around the first rotation shaft; and wherein the second lever is driven by a second shape memory alloy in one direction around the second rotation shaft and by a second spring in the other direction around the second rotation shaft.

20. The lens driving mechanism as claimed in claim 19, wherein the first shape memory alloy and the second shape memory alloy are wire-shaped, and they are overcrossed to each other in a lens barrel.

* * * * *